April 23, 1957    H. S. MONTGOMERY    2,789,684
ELEVATOR BUCKET

Filed Feb. 21, 1955    2 Sheets-Sheet 1

INVENTOR
HENRY S. MONTGOMERY
BY
Mason & Graham
ATTORNEYS

April 23, 1957     H. S. MONTGOMERY     2,789,684
ELEVATOR BUCKET

INVENTOR
HENRY S. MONTGOMERY
BY
*Mason & Graham*
ATTORNEYS

United States Patent Office 2,789,684
Patented Apr. 23, 1957

2,789,684

ELEVATOR BUCKET

Henry S. Montgomery, San Gabriel, Calif.

Application February 21, 1955, Serial No. 489,552

9 Claims. (Cl. 198—152)

This invention has to do with elevator buckets for handling bulk materials.

An object of the invention is to provide a novel elevator bucket for handling bulk materials which readily clearly discharges finely divided material and is thus especially suitable for handling granular, powdered and ground products including nonmetallics, ores, minerals, chemicals, food products, glues, and plastics.

It is well known among those familiar with the handling of relatively finely divided materials by means of elevator buckets that there is a tendency for the material to hang up in the bucket at the time of discharge due to suction or partial vacuum set up between the material and the bottom portion of the bucket. Consequently there is not a clean discharge of the material at the proper point and part of the material sticks to the inside of the bucket for a time and is subsequently discharged beyond the proper point, as down the elevator housing or casing. This condition, which is true of both continuous and centrifugal types of buckets, is extremely disadvantageous.

While attempt has been made to overcome this difficulty in the handling of materials having a steep angle of repose, such as flour, by utilizing a bucket in which the angle between the bottom and the back and the bottom and sides of the bucket is about 90° and in which holes are provided in the sides where the bottom and back join, such a construction is not suitable for granular or powdered material having a flatter angle of repose.

It is therefore an object of my invention to provide an improved bucket designed for use in handling bulk material, particularly finely divided material which has a relatively flat angle of repose, which gives a clean discharge of the product.

In this connection it is an object to provide a bucket which can be used for either continuous or centrifugal type discharge.

It is a particular object to provide a bucket embodying novel means for breaking the suction or partial vacuum between the material and the sides and bottom of the bucket when the bucket is partially tilted for discharge.

More particularly it is an object to provide a bucket embodying a main compartment and one or more, preferably a pair of, lesser compartments together with an opening connecting the main compartment with the lesser compartments so constructed that the material will, to a limited extent, flow out of the main compartment into the lesser compartments and, upon tilting of the bucket for discharge, the material in the lesser compartments will so move as to uncover the openings into the main compartment to break the suction between the material therein and the bucket before the time of discharge of the main compartment.

These and other objects will be apparent from the drawing and the following description. Referring to the drawing.

Figure 1:
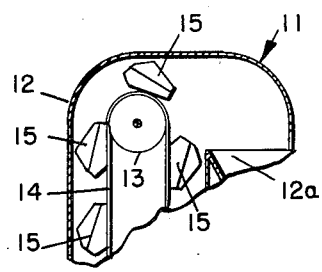
Fig. 1 is a sectional elevational view of the upper end portion of an elevator bucket conveyor equipped with buckets embodying the invention.

More particularly describing the invention, reference numeral 11 generally indicates an elevator conveyor having a housing 12 and an upper sheave 13, a belt 14 and a plurality of buckets 15 on the belt. The housing has a discharge opening 12a. Referring now to Figs. 2–5, the bucket 15 comprises a back or rear wall 16 adapted to lie flat against the belt and to be attached thereto in any suitable manner. The bucket has a lower wall 17 and two identical main side walls 18. The lower wall acts as a combined bottom and front wall. The back wall, lower wall, and side walls define a main or central compartment 19 which is open-topped being open between the upper edge 17' of the lower wall and the upper edge 16' of the rear wall. The lower wall is shown as shaped to provide a downwardly inclined rear bottom section 20 immediately adjacent the rear wall and forwardly of this an upwardly inclined forward bottom section 21. Forwardly of the latter is an inclined front 22 which is somewhat steeper.

Figure 2:
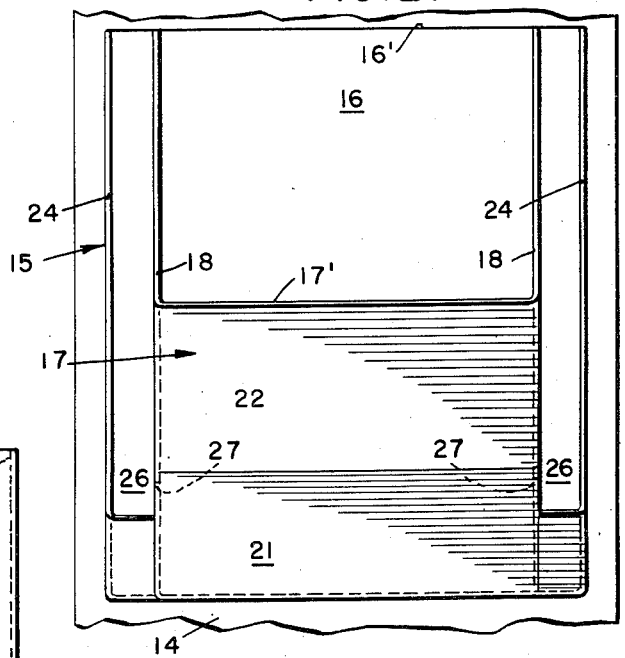
Fig. 2 is a front elevational view of a bucket embodying the invention.
Figure 3:
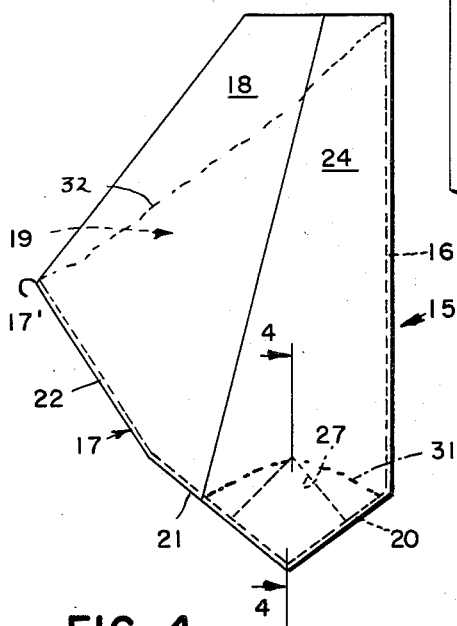
Fig. 3 is a side elevational view of the bucket of Fig. 2.
Figure 5:
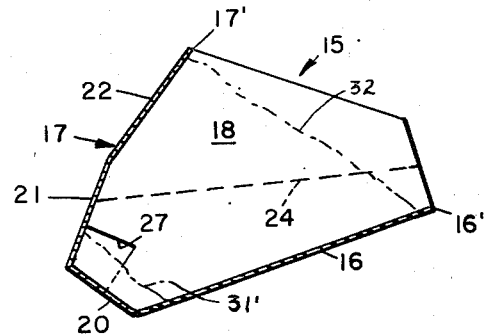
Fig. 5 is a diagrammatic view of the bucket and its contents with the bucket partially tilted for discharge.
Figure 4:
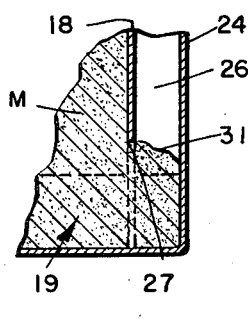
Fig. 4 is a fragmentary sectional view on line 4—4 of Fig. 3.

Outwardly of the main side walls 18 I provide auxiliary side walls 24 which are parallel to the former and spaced a short distance therefrom as best shown in Fig. 2. These walls 24 cooperate with the bottom sections 20 and 21 of the lower wall and the rear wall to provide the side pockets or compartments 26. The side walls 18 are each provided with an opening 27 which establishes communication between the lowermost part of the main compartment 19 and the side pockets or compartments 26.

In the operation of the bucket the central or main compartment is filled in any customary manner. As the central compartment fills with divided material M, such as powdered or granular products, some of the material runs out through the holes 27 in the side walls into the side compartments 26 until it covers the hole and assumes its natural angle of repose, being indicated in Fig. 3 by the broken line designated 31, material M being shown in Fig. 4. No further flow takes place. The upper limit of material in the main compartment is shown by the broken line 32. As the bucket passes over the upper end of the elevator and is tilted it will be apparent from the diagrammatic representation of Fig. 5 that the material in the side compartments will flow away from the holes 27 uncovering them before the material in the central compartment starts to discharge. The broken line 31' represents the new angle of repose of the material in the side compartments. Thus air may enter the holes 27 to prevent partial vacuum or suction from holding the material in the main compartment with the result that as the bucket becomes further tilted the material in the main compartment readily discharges therefrom. It may also be pointed out that, since the auxiliary side walls 24 extend to the top of the bucket, the material originally trapped in the side compartments discharges along with the main mass of the material from the central compartment so that all the material is discharged at the desired place.

Figure 6:
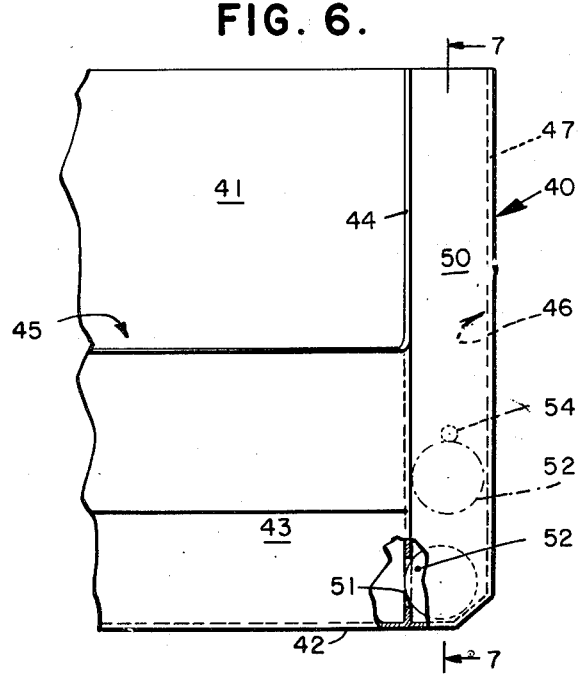
Fig. 6 is a fragmentary front elevational view of a bucket embodying another form of the invention.
Figure 7:
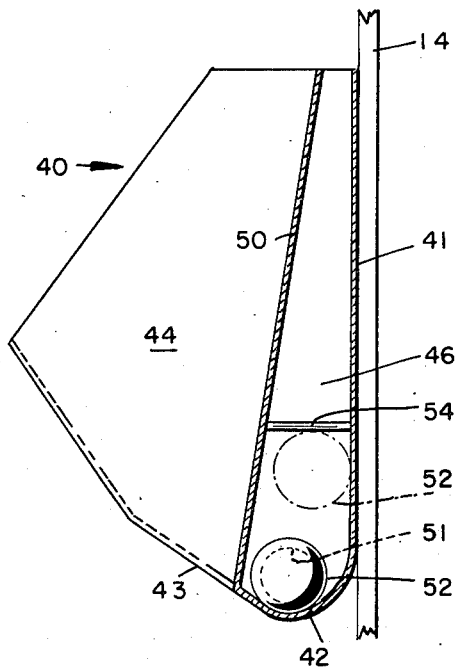
Fig. 7 is a sectional view on line 7—7 of Fig. 6.

Referring now to Figs. 6 and 7, I show a bucket 40 having a back or rear wall 41 and a rounded bottom wall portion 42 forming a continuation thereof. Also, there is a forward wall 43 continuing on from the bottom wall portion 42. Side walls 44 cooperate with the walls just described to form a central or main compartment 45.

On each side of the main compartment is an auxiliary or side compartment 46 which is defined in part by the side walls 44 and further by auxiliary side walls 47. The side compartment also has an enclosing front wall portion 50.

Between the main compartment and the side compartments are openings 51 in the side walls 44. These are positioned adjacent the bottom wall and are adapted to be closed when the bucket is upright as shown in Fig. 7 by free ball valves 52, one in each side compartment. A bar 54 extends across each of the compartments 47 to limit movement of the ball valves when the bucket is inverted.

In use, when the bucket is vertically disposed or nearly so, the ball valves 52 close the openings 51. The central compartment 45 is filled with finely divided material in any usual way. As the bucket rises and goes over the head pulley and as it begins to be tilted toward discharge position the ball valves 52 fall away from the openings 51 before the mass of material begins to move, thereby exposing the openings and the material inside the bucket compartment 45 to the atmosphere in the region of the holes 51 with the result that any tendency to form a vacuum or suction at this point as the bucket discharges is obviated. Any material which may flow outwardly through the openings 51 into the side compartments will be discharged through the openings at the upper ends of the compartments. When the bucket is turned and approaches upright position the ball valve members roll quickly into place to close the openings 51.

Although I have shown and described preferred forms of my invention, I contemplate that various changes and modifications can be made therein without departing from the invention, the scope of which is indicated by the following claims.

I claim:

1. An elevator bucket for handling finely divided materials, comprising main wall means forming an open-topped main compartment, said wall means providing openings at two opposite sides of said compartment adjacent the bottom thereof, and additional wall means integral with said main wall means spaced laterally of said two opposite sides of said main compartment forming an open-topped side compartment on each side in the region of said holes whereby to limit outward flow of divided material from said main compartment through said holes.

2. A unitary elevator bucket for handling finely divided materials comprising a rear wall adapted to be attached to an elevator belt or the like, a lower wall, and a pair of side walls, said walls defining an open-topped main compartment, additional wall means forming an open-topped side compartment at each side of said main compartment, and an opening in each side wall adjacent said lower wall establishing communication between said main compartment and each of said side compartments.

3. An elevator bucket as set forth in claim 2 in which said openings are spaced forwardly of said rear wall.

4. An elevator bucket as set forth in claim 2 in which, when said bucket is upright, said lower wall slopes downwardly away from said rear wall to a low portion and therebeyond slopes upwardly and forwardly and in which said openings in said side walls are adjacent the low portion of said lower wall.

5. An elevator bucket comprising a rear wall for attachment to a conveyor belt or the like, a lower wall including a rear bottom section inclined downwardly and forwardly of said rear wall and a forward bottom section inclined upwardly and forwardly of said rear bottom section, and a forward section extending upwardly from said forward bottom section terminating at a level below the upper edge of said rear wall, a pair of laterally spaced main side walls cooperating with said rear and lower walls to form a main compartment, and an auxiliary side wall spaced laterally of each main side wall, said auxiliary side walls extending forwardly of said rear wall but being of less width than said main side walls, said auxiliary side walls cooperating with said rear wall, said main side walls and with said bottom sections of said lower wall to form a side compartment at each side of said main compartment, each of said main side walls having an opening adjacent said bottom sections of said lower wall establishing communication between the main compartment and each side compartment.

6. An elevator bucket comprising main wall means forming an open-topped main compartment, said wall means providing openings at two opposite sides of said compartment adjacent the bottom thereof, additional wall means spaced laterally of said two opposite sides of said main compartment forming an open-topped side compartment on each side in the region of said holes, a ball valve in each side compartment movable by gravity to close said holes when said bucket is upright, and ball valve retaining means in each side compartment permitting limited movement of said ball valves away from said holes as said bucket is inclined and inverted.

7. An elevator bucket for handling finely divided materials comprising wall means forming an open-topped main compartment, said wall means having an opening at the side and adjacent the bottom of the compartment, and additional wall means forming an open-topped side compartment about said opening, said main wall means and said additional wall means being integral.

8. An elevator bucket as set forth in claim 7 in which there is a valve member within said side compartment constructed and arranged to close said opening when said bucket is upright.

9. An elevator bucket as set forth in claim 7 in which a free ball valve is contained in said side compartment and in which said bucket and said ball valve are so proportioned that said valve closes said opening when said bucket is upright and is free to leave said opening when said bucket is tilted sufficiently.

References Cited in the file of this patent

UNITED STATES PATENTS

| | | |
|---|---|---|
| 640,762 | Gray | Jan. 9, 1900 |
| 2,177,171 | Crews | Oct. 24, 1939 |